(12) United States Patent
Chang et al.

(10) Patent No.: US 8,292,440 B2
(45) Date of Patent: Oct. 23, 2012

(54) PROJECTION MODULE AND ADJUSTMENT MECHANISM THEREOF

(75) Inventors: Chi-Wei Chang, Hsinchu (TW); Wei-Szu Lin, Hsinchu (TW); Hsu-Chun Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 329 days.

(21) Appl. No.: 12/850,856

(22) Filed: Aug. 5, 2010

(65) Prior Publication Data

US 2011/0043772 A1 Feb. 24, 2011

(30) Foreign Application Priority Data

Aug. 19, 2009 (CN) .......................... 2009 1 0163019

(51) Int. Cl.
*G03B 21/14* (2006.01)
*G02B 7/02* (2006.01)
(52) U.S. Cl. .................... 353/101; 359/694; 359/823
(58) Field of Classification Search .................. 353/100, 353/101; 359/649, 694, 822, 823
See application file for complete search history.

(56) References Cited

U.S. PATENT DOCUMENTS

| 6,966,657 | B2 | 11/2005 | Van De Velde et al. |
| 7,090,360 | B2 | 8/2006 | Kuroda et al. |
| 2010/0208219 | A1* | 8/2010 | Lee ............................. 353/101 |
| 2010/0265475 | A1* | 10/2010 | Jeon et al. ..................... 353/101 |
| 2010/0290012 | A1* | 11/2010 | Huang et al. .................. 353/101 |
| 2011/0292524 | A1* | 12/2011 | Kang et al. .................... 359/811 |

FOREIGN PATENT DOCUMENTS

| TW | M245456 | 10/2004 |
| TW | M272118 | 8/2005 |
| TW | I248548 | 2/2006 |
| TW | I300160 | 8/2008 |

\* cited by examiner

*Primary Examiner* — William C Dowling
(74) *Attorney, Agent, or Firm* — J.C. Patents

(57) ABSTRACT

A projection module includes a base, a light source, a light valve, a lens module, and an adjustment module. The light source is disposed on the base and capable of providing an illumination beam. The light valve is disposed on the base and capable of converting the illumination beam into an image beam. The lens module is slidably disposed on the base and capable of projecting the image beam. The adjustment mechanism includes a rolling wheel and a slide pin. The rolling wheel is pivotably mounted to the base and includes a slide groove. The slide pin is fixed to the lens module and extends into the slide groove. The rolling wheel is capable of pivoting to drive the slide groove to pivot and the slide groove moves the slide pin to drive the lens module to move with respect to the base when the slide groove pivots.

11 Claims, 3 Drawing Sheets

PROJECTION MODULE AND ADJUSTMENT MECHANISM THEREOF

CROSS-REFERENCE TO RELATED APPLICATION

This application claims the priority benefit of China application serial no. 200910163019.7, filed on Aug. 19, 2009. The entirety of the above-mentioned patent application is hereby incorporated by reference herein and made a part of this specification.

BACKGROUND OF THE INVENTION

1. Field of the Invention

The invention relates to a display module and an adjustment mechanism of the display module, and more particularly, to a projection module and an adjustment mechanism of the projection module.

2. Description of Related Art

A projector is a display apparatus for producing a large-size image. The image of the projector is produced by using a light valve to convert an illumination beam generated by a light source module into an image beam and a lens module to project the image beam onto a screen or a wall. Following the development of the projection technology and reduction of fabrication cost, applications for a projector have been gradually expanded from commercial use to home use.

In general, the projector needs an adjustment mechanism to adjust the size and clarity of the image. The adjustment mechanism may consist of a cam and multiple linking rods. In this adjustment mechanism, a pivotal movement of the cam is converted into a linear movement of the lens module through cooperation of the cam and the multiple linking rods so as to achieve the adjustment of the lens module. However, more components may incur higher fabrication cost and degraded reliability of the adjustment mechanism. Taiwan Patent Nos. 1248548, M272118, 1300160, M245456 and U.S. Pat. Nos. 7,090,360, 6,966,657 disclose some techniques for adjusting the lens module.

SUMMARY OF THE INVENTION

Accordingly, the invention is directed to a projection module which includes an adjustment mechanism capable of improving the reliability and reducing the fabrication cost.

The invention is also directed to an adjustment mechanism which is capable of improving the reliability and reducing the fabrication cost.

In one aspect, the invention provides an adjustment mechanism for a projection module. The projection module includes a base and a lens module. The lens module is slidably disposed on the base along a slide axis. The adjustment mechanism includes a rolling wheel and a slide pin. The rolling wheel is adapted to be pivotably mounted to the base for pivoting about a pivot axis and includes a slide groove. The slide pin is adapted to be fixed to the lens module and extends into the slide groove. The rolling wheel is capable of pivoting to drive the slide groove to pivot, the slide groove moves the slide pin to drive the lens module to move along the slide axis with respect to the base when the slide groove pivots.

In another aspect, the invention provides a projection module including a base, a light source, a light valve, a lens module, and an adjustment module. The light source is disposed on the base and capable of providing an illumination beam. The light valve is disposed on the base and capable of converting the illumination beam into an image beam. The lens module is slidably disposed on the base along a slide axis and capable of projecting the image beam to form an image. The adjustment mechanism includes a rolling wheel and a slide pin. The rolling wheel is pivotably mounted to the base for pivoting about a pivot axis and includes a slide groove. The slide pin is fixed to the lens module and extends into the slide groove. The rolling wheel is capable of pivoting to drive the slide groove to pivot and the slide groove moves the slide pin to drive the lens module to move along the slide axis with respect to the base when the slide groove pivots.

In view of the foregoing, in some aspects of the embodiments of the invention, the adjustment mechanism includes a rolling wheel and a slide pin, and the rolling wheel is capable of pivoting to drive the slide groove to pivot and the slide groove moves the slide pin, and adjustment mechanism adjusts the lens module connected to the slide pin. In comparison with the conventional adjustment mechanism which consists of the cam and multiple linking rods, the adjustment mechanism of the above embodiments of the invention employs the rolling wheel and the slide pin thus improving the reliability as well as reducing the fabrication cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and/or other aspects and advantages of the invention will become apparent and more readily appreciated from the following description of the embodiments taken in conjunction with the accompanying drawings of which.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
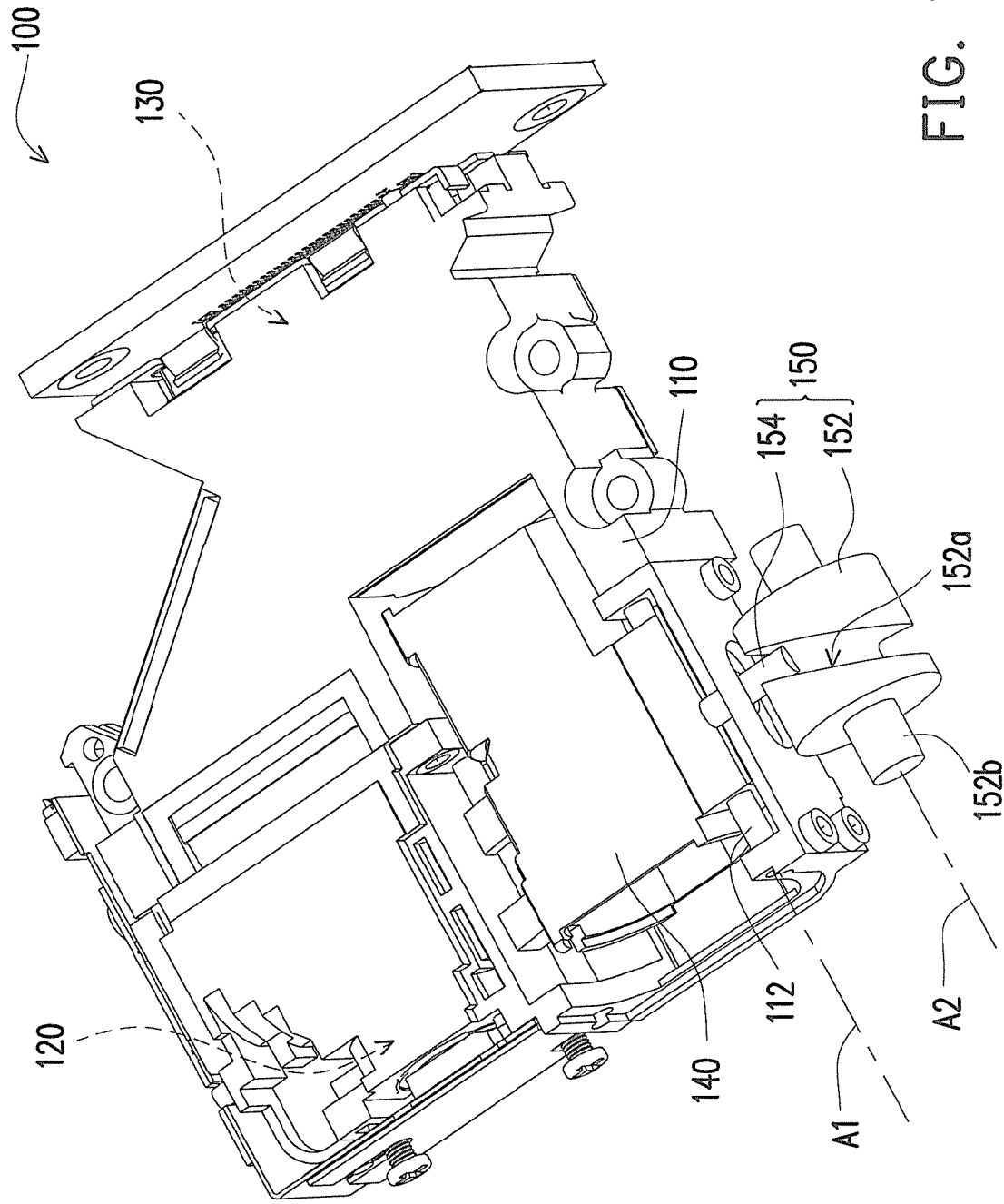
FIG. 1 is a partial view of a projection module according to one embodiment of the invention.
Figure 2:
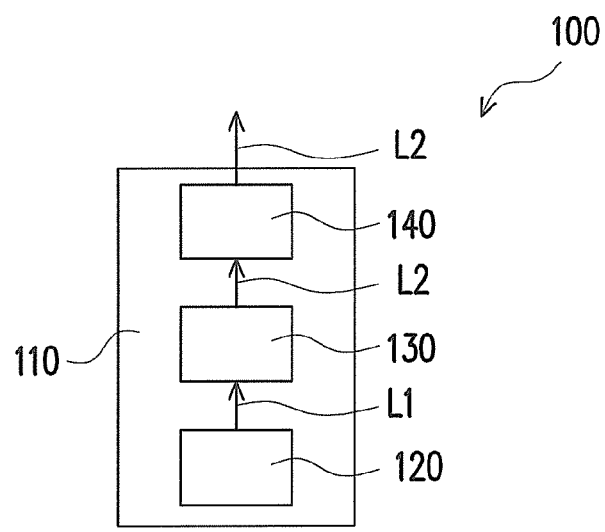
FIG. 2 is a schematic view of the projection module of FIG. 1.
Figure 3:
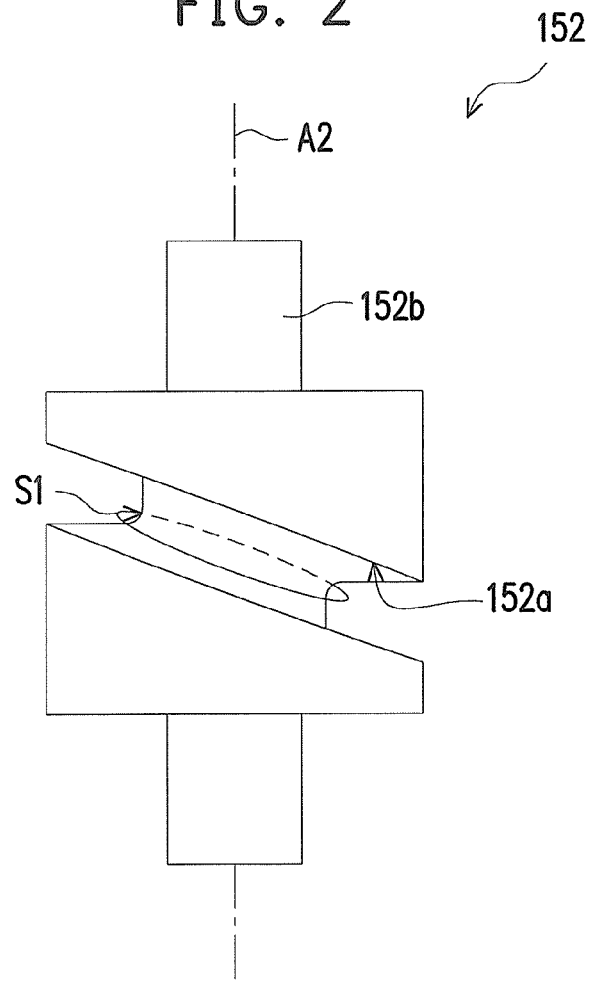
FIG. 3 is a side view of the rolling wheel of FIG. 1.

FIG. 1 is a partial view of a projection module according to one embodiment of the invention. FIG. 2 is a schematic view of the projection module of FIG. 1. FIG. 3 is a side view of the rolling wheel of FIG. 1. Referring to FIGS. 1 and 2, the projection module 100 of the embodiment is for a projector (not shown) and includes a base 110, a light source 120, a light valve 130, a lens module 140, and an adjustment mechanism 150. The light source 120 is disposed on the base 110 and capable of providing an illumination beam L1. The light valve 130 is disposed on the base 110 and capable of converting the illumination beam L1 into an image beam L2. The lens module 140 is slidably disposed on the base 110 along a slide axis A1. The lens module 140 is capable of projecting the image beam L2 to form an image.

Referring to FIGS. 1 and 3, the adjustment mechanism 150 includes a rolling wheel 152 and a slide pin 154. The rolling wheel 152 is pivotably mounted to the base 110 for pivoting about a pivot axis A2 and includes a slide groove 152a therein. The slide pin 154 is fixed to the lens module 140 and extends into the slide groove 152a. The rolling wheel 152 is capable of pivoting to drive the slide groove 152a to pivot. Once the slide groove 152a pivots, the pivoting slide groove 152a moves the slide pin 154, and the slide pin 154 drives the lens module 140 to move along the slide axis A1 with respect to the base 110. A user may pivot the rolling wheel 152 to drive the lens 140 to move and thereby the focus of the lens module 140 is adjusted. In comparison with the conventional adjustment mechanism which consists of a cam and multiple linking rods, the adjustment mechanism 150 of the embodiment employs the rolling wheel 152 and the slide pin 154 to adjust the lens module 140, thus simplifying of the mechanism so as to increase the reliability as well as reducing the fabrication cost.

Referring to FIG. 1, in the embodiment, the adjustment mechanism 150 may drive the lens module 140 and hence the lens (not shown) therein to move back and forth along the slide axis A1 to adjust the focus of the lens module 140 in the manner as described above. However, the invention should not be limited to any particular embodiment described herein. Rather, in alternative embodiments not illustrated, the lens module 140 may include more than two lens groups and the adjustment mechanism 150 may drive one of the lens groups to move along the slide axis A1 with respect to the other lens group, so as to adjust the size of the image formed by the lens module 140.

Referring to FIG. 1 and FIG. 3, the rolling wheel 152 of the embodiment includes a pivot axle 152b. The pivot axle 152b is pivotably mounted to the base 110 for pivoting about the pivot axis A2 such that the rolling wheel 152 may pivot about the pivot axis A2 with respect to the base 110. It should be noted that, for clarity, a bearing for pivotably mounting the pivot axle 152b to the base 110 is not illustrated in FIG. 1. In addition, the base 110 includes a rod 112 extending along the slide axis A1. The lens module 140 is slidably disposed on the rod 112, so as to move along the slide axis A1 with respect to the base 110. Specifically, in the embodiment, the slide axis A1 is substantially parallel to the pivot axis A2 (shown in FIG. 1), and two ends of the slide groove 152a communicate with each other, so as to define an elliptical slide path S1 (shown in FIG. 3). Once the rolling wheel 152 pivots about the pivot axis A2, the rolling wheel 152 drives the slide groove 152a to pivot, such that the slide pin 154 slides along the elliptical slide path S1 and the slide groove 152a moves the slide pin 154, and the slide pin 154 drives the lens module 140 to slide along the slide axis A1.

Figure 4:
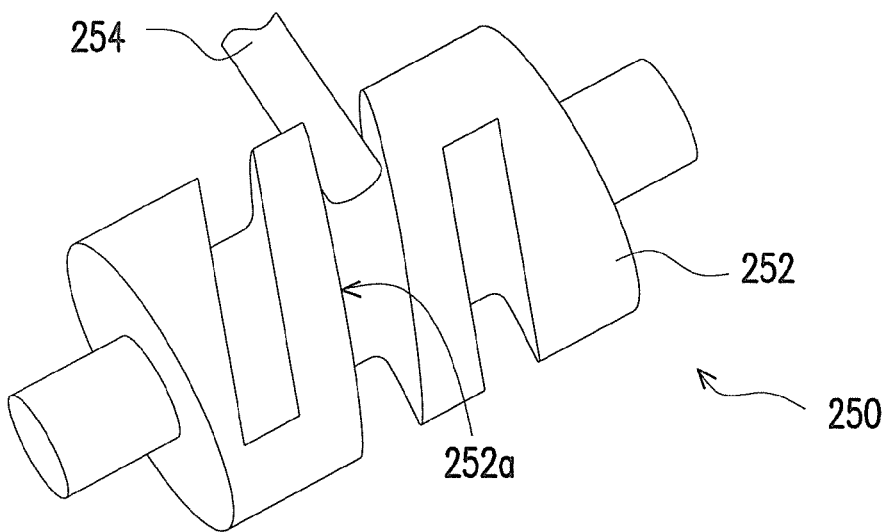
FIG. 4 is a solid diagram of an adjustment mechanism according to another embodiment of the invention.
Figure 5:
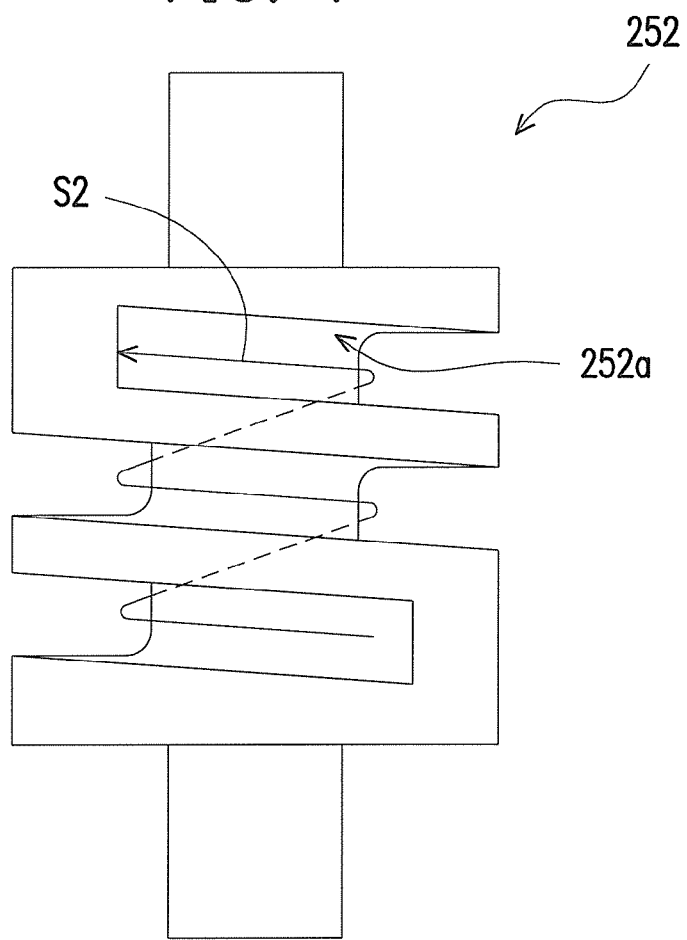
FIG. 5 is a side view of the rolling wheel of FIG. 4.

FIG. 4 is a solid diagram of an adjustment mechanism according to another embodiment of the invention. FIG. 5 is a side view of the rolling wheel of FIG. 4. Referring to FIGS. 4 and 5, instead of the elliptical slide path S1 defined by the slide groove 152a of the rolling wheel 152, in the embodiment, the slide groove 252a of the rolling wheel 252 of the adjustment mechanism 250 defines a helical slide path S2, and the slide pin 254 may slide along the helical slide path S2. In other words, the invention is not intended to limit the slide groove of the rolling wheel to any form described herein and, therefore, among others, it may be the elliptical slide path S1 defined by the slide groove 152a circling the rolling wheel 152 once as shown in FIG. 3, or alternatively be the helical slide path S2 defined by the slide groove 252a circling the rolling wheel 252 from top to bottom thereof as shown in FIG. 5.

In summary, the embodiment or embodiments of the invention may have at least one of the following advantages: the adjustment mechanism includes a rolling wheel and a slide pin and the rolling wheel is capable of pivoting to drive the slide groove to pivot. Once the slide groove pivots, the pivoting slide groove moves the slide pin, the slide pin drives a lens module to slide along a slide axis with respect to a base so as to adjust the lens module connected to the slide pin. In comparison with the conventional adjustment mechanism which consists of the cam and multiple linking rods, the adjustment mechanism of the above embodiments of the invention employs the rolling wheel and the slide pin thus improving the reliability as well as reducing the fabrication cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An adjustment mechanism adapted for a projection module, the projection module comprising a base and a lens module, the lens module being slidably disposed on the base along a slide axis, the adjustment mechanism comprising:
a rolling wheel adapted to be pivotably mounted to the base for pivoting about a pivot axis and comprising a slide groove; and
a slide pin adapted to be fixed to the lens module and extending into the slide groove;
wherein the rolling wheel is capable of pivoting to drive the slide groove to pivot and the slide groove moves the slide pin to drive the lens module to move along the slide axis with respect to the base when the slide groove pivots.

2. The adjustment mechanism according to claim 1, wherein the rolling wheel comprises a pivot axle pivotably mounted to the base.

3. The adjustment mechanism according to claim 1, wherein the slide axis is substantially parallel to the pivot axis.

4. The adjustment mechanism according to claim 1, wherein two ends of the slide groove communicate with each other to define an elliptical slide path and the slide pin is capable of sliding along the elliptical slide path.

5. The adjustment mechanism according to claim 1, wherein two ends of the slide groove are separated from each other to define a helical slide path and the slide pin is capable of sliding along the helical slide path.

6. A projection module comprising:
a base;
a light source disposed on the base and capable of providing an illumination beam;
a light valve disposed on the base and capable of converting the illumination beam into an image beam;
a lens module slidably disposed on the base along a slide axis and capable of projecting the image beam to form an image;
an adjustment mechanism comprising:
a rolling wheel pivotably mounted to the base for pivoting about a pivot axis and comprising a slide groove; and
a slide pin fixed to the lens module and extending into the slide groove;
wherein the rolling wheel is capable of pivoting to drive the slide groove to pivot and the slide groove moves the slide pin to drive the lens module to move along the slide axis with respect to the base when the slide groove pivots.

7. The projection module according to claim 6, wherein the rolling wheel comprises a pivot axle pivotably mounted to the base.

8. The projection module according to claim 6, wherein the slide axis is substantially parallel to the pivot axis.

9. The projection module according to claim 6, wherein two ends of the slide groove communicate with each other to define an elliptical slide path and the slide pin is capable of sliding along the elliptical slide path.

10. The projection module according to claim 6, wherein two ends of the slide groove are separated from each other to define a helical slide path and the slide pin is capable of sliding along the helical slide path.

11. The projection module according to claim 6, wherein the base comprises a rod extending along the slide axis and the lens module is slidably disposed on the rod.

* * * * *